United States Patent [19]
Danneels

[11] Patent Number: 5,832,232
[45] Date of Patent: Nov. 3, 1998

[54] METHOD AND APPARATUS FOR PROVIDING USER-BASED FLOW CONTROL IN A NETWORK SYSTEM

[75] Inventor: Gunner D. Danneels, Beaverton, Oreg.

[73] Assignee: Intel Corporation, Santa Clara, Calif.

[21] Appl. No.: 766,087

[22] Filed: Dec. 16, 1996

[51] Int. Cl.⁶ .................................................. G06F 15/16

[52] U.S. Cl. ....................................... 395/200.65; 707/501

[58] Field of Search ...................... 395/200.47, 200.57, 395/200.67, 200.64, 200.65; 707/501, 529, 539, 513

[56] References Cited

U.S. PATENT DOCUMENTS

| | | | |
|---|---|---|---|
| 5,132,902 | 7/1992 | Williams | 395/200.57 |
| 5,572,678 | 11/1996 | Homma et al. | 395/200.57 |
| 5,708,825 | 1/1998 | Sotomayor | 395/762 |

*Primary Examiner*—Mehmet B. Geckil
*Attorney, Agent, or Firm*—Blakely, Sokoloff, Taylor & Zafman

[57] ABSTRACT

A method and apparatus for providing user-based flow control in a network system receives a request for data from a client system and determines a period of time based on an expected user processing time for the data. A first portion of the requested data is sent to the client system and, after the period of time has elapsed, a second portion of the requested data is sent to the client system.

20 Claims, 4 Drawing Sheets

METHOD AND APPARATUS FOR PROVIDING USER-BASED FLOW CONTROL IN A NETWORK SYSTEM

BACKGROUND OF THE INVENTION

1. Field of the Invention

The present invention pertains to the field of networks. More particularly, this invention relates to providing user-based flow control in a network.

2. Background

As computer technology has advanced the use of networks has continually increased. A network refers to a system which can couple together two or more computer systems such that the systems can communicate with one another. One particular type of network which has become popular recently is the Internet. Typically in a network system one computer system, referred to as the client system, accesses a second computer system, referred to as the host system, in order to obtain data from the host system.

One problem with networks, however, is that they have limited bandwidth. The bandwidth of a network refers to the amount of data per unit of time that can be transferred between two systems in the network. The host systems themselves also suffer from having limited bandwidth, and, depending on the popularity of the host system, often times are unable to immediately service all requests from client systems due to other previously received requests. Thus, it would be beneficial to provide a way to increase the flow of data both from the host system and within the network itself.

Additionally, one characteristic of networks is the fact that an individual user of a client system often times does not need the entirety of the data requested. For example, a specific piece of the data may be all that is truly necessary, or after seeing the beginning of the data the user may realize that the requested data is not what the user is truly looking for. However, with networks in general, and the Internet in particular, host systems typically send the entirety of the requested data to the user, unless the user takes action to stop the data transfer (for example, pressing a stop button at the client system). Therefore, the entirety of the data may already have been sent to the user before he or she realizes that the entire data is not necessary. Thus, it would be beneficial to provide a way to control the flow of data to client systems so that transmission of unnecessary data to the client system is reduced.

As will be described in more detail below, the present invention provides a method and apparatus for providing user-based flow control in a network system which achieves these and other desired results which will be apparent to those skilled in the art from the description that follows.

SUMMARY OF THE INVENTION

A method and apparatus for providing user-based flow control in a network system is described herein. A request for data is received from a client system and a period of time is determined based on an expected user processing time for the data. A first portion of the requested data is sent to the client system and, after the period of time has elapsed, a second portion of the requested data is sent to the client system.

According to one embodiment of the present invention, a host system sending the data to the client system automatically separates the requested data into two or more portions by scanning the data for certain commands.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following description, various aspects of the present invention will be described. However, it will be understood by those skilled in the art that the present invention may be practiced with only some or all aspects of the present invention. For purposes of explanation, specific numbers, materials and configurations are set forth in order to provide a thorough understanding of the present invention. However, it will also be apparent to those skilled in the art that the present invention may be practiced without these specific details.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the discussions to follow reference is made to data "flow". The flow of data refers to how quickly the data is transferred. For example, how fast the data is transferred from a host system to a requesting client system.

The present invention provides a method and apparatus for providing user-based flow control in a network system. A host system receives a request for data and separates the requested data into multiple portions. The data is then sent to the host system in portions with a time delay between each of the portions.

Figure 1:
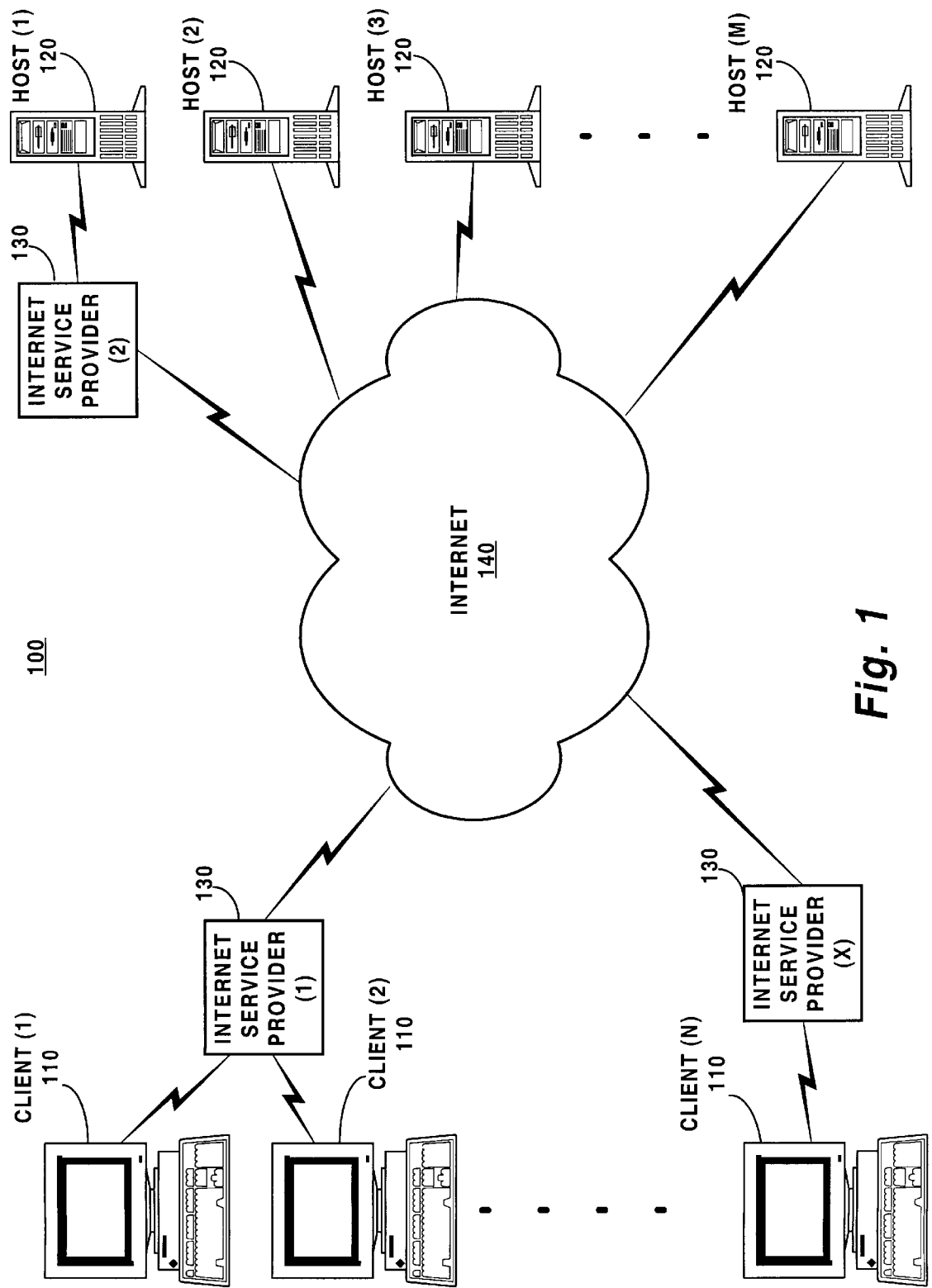
FIG. 1 is a block diagram illustrating a network environment in which the present invention may be practiced.

FIG. 1 is a block diagram illustrating a network environment in which the present invention may be practiced. As illustrated, network environment 100 includes multiple (N)

client systems 110 and multiple (M) host systems 120, collectively referred to as network systems. Network environment 100 also includes multiple (X) Internet service providers (ISPs) 130 and the Internet 140. Each client system 110 can be any of a wide range of computing devices which provide a user with the ability to access the Internet 140.

Each ISP 130 is typically a computer system having a large amount of storage space (typically on the order of hundreds of gigabytes or terabytes) and multiple communication lines for accessing both the client systems 110 and the Internet 140.

Each host system 120 is also typically a computer system which can be accessed by the client systems 110. According to one embodiment, each host system 120 includes one or more HyperText Markup Language (HTML) compatible web pages which can be accessed via the HyperText Transfer Protocol (HTTP) and displayed by an HTML compatible Internet browser running on a client system 110.

The Internet 140 is a combination of multiple conventional hardware components, including computer systems, routers, repeaters, gateways, and communications links spread throughout the world. These hardware components are organized hierarchically to provide multiple logical levels of networks. The hardware components of Internet 140 interact to route data from one computer system to another. According to one implementation, data is transferred between computer systems using the well-known Transmission Control Protocol/Internet Protocol (TCP/IP) protocol. The data is typically transferred in units referred to as "packets" or "datagrams". Typically, each packet includes data, a source address identifying the system which initiated the packet and a target address identifying the system to which the packet is to be sent. Additional control information, such as a checksum, may also be included in the packet. The number of bytes of data contained within a packet is dependent on the network protocol being used.

The communication links illustrated in FIG. 1 may be any of a wide range of conventional communication media, and may be different for different systems 110, host systems 120, and ISPs 130. For example, a communication link may be a cable, a fiber-optic cable, or may represent a nonphysical medium transmitting electromagnetic signals in the electromagnetic spectrum. Additionally, a communication link may also include any number of conventional routing or repeating devices, such as satellites or electromagnetic signal repeaters.

It is to be appreciated that although the client systems 110 and host systems 120 are illustrated as being different machines, a single hardware system may be both a client system and a host system. If the hardware system is initiating an access for information to another system then the hardware system is referred to as a client system. However, if the hardware system is being accessed by another system to obtain information from the hardware system then the hardware system is referred to as a host system.

It is to be appreciated that additional networks may also be included in the network environment 100. For example, multiple client systems 110 may be coupled together in an Ethernet, token ring, or other conventional network and access an ISP 130 through this additional network.

Figure 2:
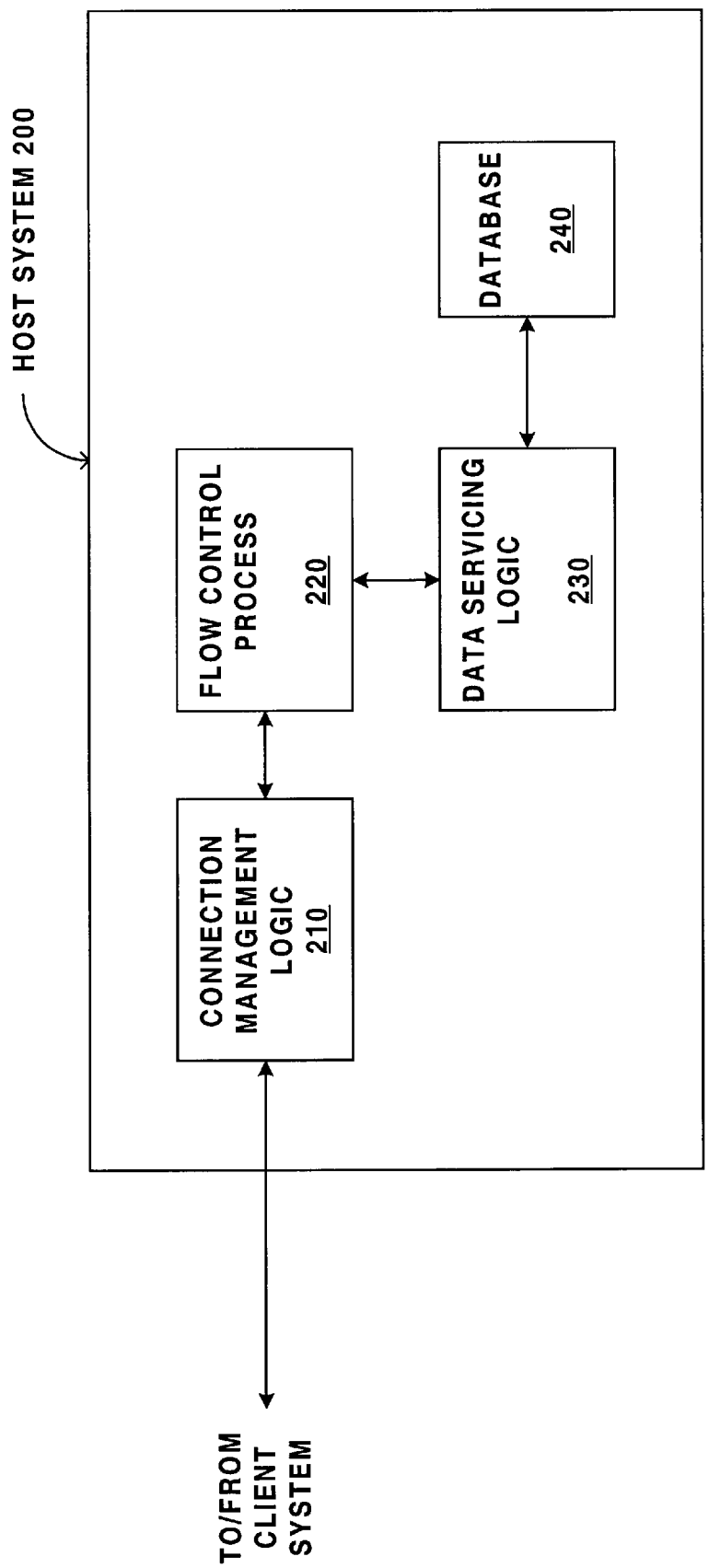
FIG. 2 is a simplified block diagram illustrating a system architecture of a host system according to one embodiment of the present invention.

FIG. 2 is a simplified block diagram illustrating a system architecture of a host system according to one embodiment of the present invention. In the illustrated embodiment, each of one or more host systems 120 of FIG. 1 are a host system 200. As shown, host system 200 includes connection management logic 210, flow control process 220, data servicing logic 230, and database 240.

Database 240 stores the data which can be requested by client systems. It is to be appreciated that any of a wide variety of data can be stored in database 240, including graphic and text data. According to one embodiment of the present invention, database 240 stores data as separate HTML web pages.

Data servicing logic 230 retrieves requested data from database 240. A request from a client system for data is received by data servicing logic 230 which retrieves the requested data from database 240 and forwards the data to the requesting client system via flow control process 220 and connection management logic 210.

Flow control process 220 controls the flow of data from host system 200 to the requesting client system. Flow control process 220 receives data requested by a client system from data servicing logic 230 and separates the requested data into two or more portions. The portions are then forwarded to connection management logic 210 with a time delay between each portion. Flow control process 220 determines the separation points for the portions of data and the time delay between portions based on an expected user processing time, as discussed in more detail below.

Connection management logic 210 controls the connection between host system 200 and client systems which access host system 200. According to one embodiment, connection management logic 210 can maintain multiple concurrent connections to various client systems in accordance with the TCP/IP protocol. Connection management logic 210 may also separate each portion of data into multiple packets for transmission to the client system in order to reduce the size of each packet sent over the network. Whether connection management logic 210 separates each portion of data into multiple packets is dependent on the particular protocol being followed and the packet size(s) supported by that protocol.

Figure 3:
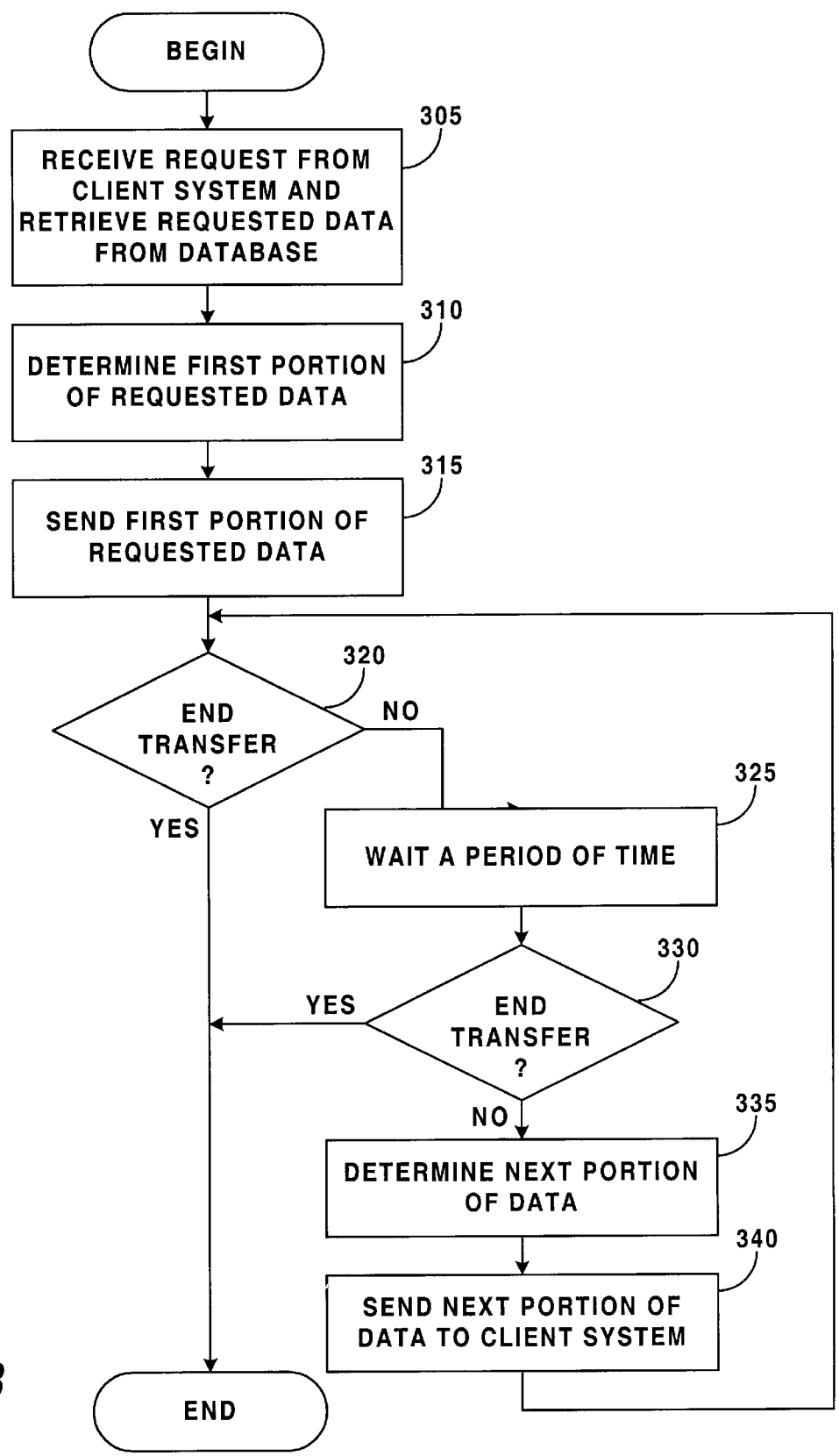
FIG. 3 is a flowchart illustrating the steps followed in providing data to a client system from a host system according to one embodiment of the present invention.

FIG. 3 is a flowchart illustrating the steps followed in providing data to a client system from a host system according to one embodiment of the present invention. The host system first receives the request for data from the client system and the data servicing logic obtains the requested data from the database at the host system, step 305. The flow control process then determines a first portion of the data, step 310, and sends a first portion of the requested data to the client system via the connection management logic, step 315.

The flow control process then checks whether the data transfer to the client system is to end, step 320. If the data transfer is to end, then the process ends without transferring any more of the requested data to the client system. However, if the data transfer is to continue, then the flow control process waits for a period of time, step 325. This period of time is based on an expected user processing time of the requested data. After the period of time has elapsed, the flow control process again checks whether the data transfer to the client system is to end, step 330. If the data transfer is to continue, then the flow control process determines the next portion of data, step 335, and sends the next portion of data to the client system via the connection management logic, step 340. The flow control process then returns to step 320 to check whether the transfer is complete. Thus, the host system continues to send the requested data to the client system in portions until the transfer is complete.

It is to be appreciated that the flow control process can determine that the data transfer is to end (steps 320 and 330)

in any of a wide variety of conventional manners. For example, the data transfer ends when all of the requested data has been sent to the requesting client system. By way of another example, the data transfer ends upon receipt of a stop transfer command from the client system. This stop transfer command could be a direct user request to stop, such as clicking on a "stop" button in a graphical user interface, or could be an indirect request to stop, such as by a user selecting a different host system to access.

In the illustrated embodiment, the flow control process checks whether the data transfer is to end after the period of time has elapsed (step 330). This check allows the flow control process to react to any stop transfer commands which may have been received from the client system during the period of waiting. In alternate embodiments, step 330 is not performed.

It is to be appreciated that the separation of the requested data into portions and the determination of the period of time between portions can be accomplished by the flow control process in any of a wide variety of manners. In the illustrated embodiment, the flow control process determines the portions and the period of time between portions based on the expected user processing time for the data. In other words, the flow control process makes the determination based on how quickly the flow control process expects the user of the requesting client system to process (for example, view) the requested data. In the illustrated embodiment, the goal of the flow control process is to balance the sending of the requested data in small portions and with large periods of time between portions so as not to overburden either the network or the host system against ensuring that the portions are large enough and the period of time between portions small enough so that the user of the client system does not have to wait for data he or she is ready to view. In one implementation, the ideal flow of data would provide the user with a portion of data just prior to that user being ready to view that portion.

According to one embodiment of the present invention, the flow control process employs an adaptive algorithm which monitors accesses by client systems to the data. The flow control process attempts to categorize each web page as either a transition page or a destination page. A transition page is a page which is viewed briefly by a user before selecting another page (for example, an HTML link to another page) on either this host system or another host system. Often times, a user will not look at all of the transition page, rather he or she will select another page before all of the data for the transition page has been transferred. A destination page, however, is a page which is viewed longer by a user before selecting another page. Often times, a user reads a large percentage, if not all, of a destination page.

The adaptive algorithm used by the host system monitors the accesses to each page stored in its database and attempts to classify each as either a destination page or a transition page. The flow control process, when determining portions, separates transition pages into smaller portions and destination pages into larger portions.

According to an alternate embodiment, a user of the host system can identify where the separations are to occur. This could be done, for example, by the host system user inserting an additional command or other identifier in each of the web pages when the web page is designed which defines where a separation should occur. The flow control process can then read these commands and separate the data between commands as individual portions.

According to another alternate embodiment, the flow control process scans the web page for various commands which can be used to determine the separation of portions. For example, an HTML web page can have data represented in a range of formats such as tables, lists, menus, block quotations, headings, etc. The flow control process can scan through the data looking for the different formats and separate the data into portions based on these different formats. By way of example, the flow control process may identify the beginning of a portion of the data where a heading begins (identified by the command <Hn>, where n ranges from 1 to 6). The commands used to format HTML web pages are well known to those skilled in the art, and thus will not be discussed further.

According to another alternate embodiment, the separation could be based on the size of the file or a constant value. For example, each file, regardless of its size, may be separated into a predetermined number of approximately equal portions. By way of another example, each portion could be the same number of bytes, such as 1,024 bytes or 8,192 bytes, with the last portion being whatever is left. According to one implementation, if there is a particular data transfer size the network is most efficient at handling, the number of bytes in a portion is that data transfer size.

According to another alternate embodiment, text and graphics data are treated separately. Text data typically takes longer to view and comprehend by a user than graphics data of the equivalent size does. Thus, the text data would be separated into smaller portions while the graphics data would be separated into larger portions.

According to another alternate embodiment, the flow control process monitors previous accesses to the data in order to determine the separation of data. In this embodiment, the flow control process monitors client system accesses and maintains a record of when users of the client systems have indicated to stop receiving data from the host system. That is, the flow control process monitors how much data has actually been transferred as a result of previous client system accesses. The flow control process then separates the data into two portions with the separation point being based on the previous accesses. For example, the average amount of data transferred in the previous accesses could be calculated and used to identify the separation point between the two portions in this embodiment.

It is to be appreciated that each portion for a particular page of data need not be of the same size.

The determination of the period of time between sending portions of data can also vary. It is to be appreciated that the size of the portions and the period of time between the sending of portions are related. Those skilled in the art will realize that the larger the portions of data, the less frequently they need to be sent in order to avoid causing a user to wait for data, and correspondingly the smaller the portions of data, the more frequently they need to be sent.

Many of the same methods discussed above with respect to portion sizes can be applied analogously to the determination of the periods of time between portions. For example, the time may be constant, or may vary dependent on whether the previous portion was graphics data or text data. By way of another example, the timing may be programmed into each page by the user of the host system.

It is to be appreciated that situations can arise where a host system has one or more portions of data waiting to be sent to a client system but is currently not sending any portions because the period(s) of time before the next portion(s) of data are to be sent to the client system(s) has not elapsed yet.

In one implementation, the flow control process cuts short the period of time for one or more of the portions so that the host system does not sit idle while there are outstanding requests to the host system. Alternatively, the flow process could observe the periods of time as they stand and simply sit idle until the next period of time elapses.

It is also to be appreciated that each period of time can be responsive to specific requests from the user of the client system. For example, the network browser running on the client system could be modified to include "scan" and "read" options. These options could be, for example, additional buttons on a graphical user interface that can be clicked on by a system user. When one of these options is selected, a message is sent to the host system indicating which option has been selected. This gives the host system a good indication of how quickly the user will be processing the requested data. Selection of the scan option by the client system user indicates to the flow control process at the host system to increase the size of the portions and/or decrease the period of time between portions. Selection of the read option by the client system user indicates to the flow control process at the host system to decrease the size of the portions and/or increase the period of time between portions.

It should be noted that situations can arise where one or more portions of data received at a client system cannot be displayed to the user of the client system without additional portions. For example, key information in a subsequent portion, such as the screen location where the data is to be displayed, may be necessary in order for the client system to display the one or more portions. In this situation, the client system waits until the requisite additional information is received, in subsequent portions, to display the one or more portions of data. In one implementation, the client system treats the delay between portions of data in the same manner as it would treat a delay in receiving a required packet of data from the network.

Figure 4:
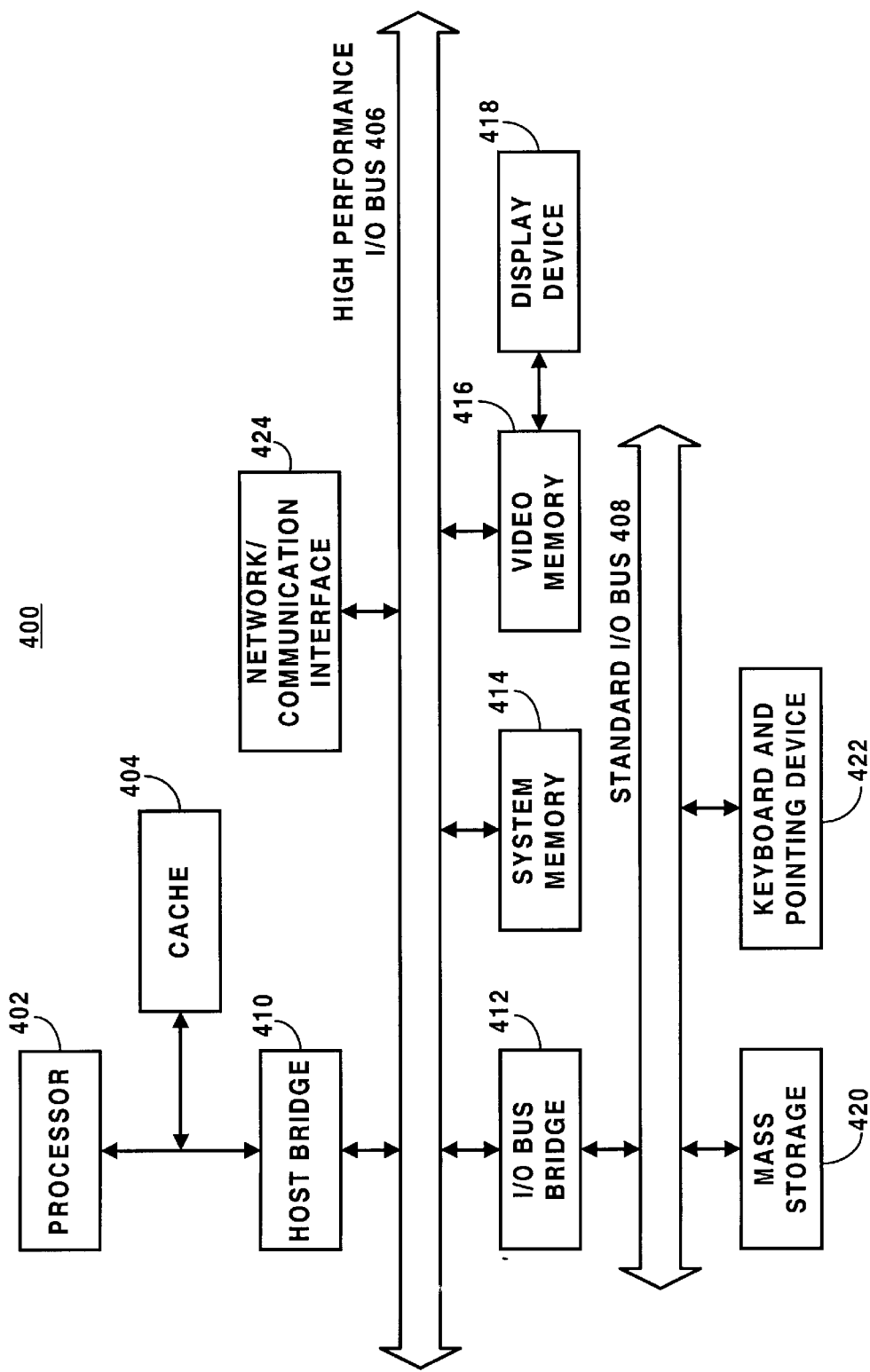
FIG. 4 illustrates one embodiment of a hardware system suitable for use with the present invention.

FIG. 4 illustrates one embodiment of a hardware system suitable for use with the present invention. In one embodiment, each of the client systems 110 and host systems 120 illustrated in FIG. 1 are hardware systems 400 of FIG. 4. In the illustrated embodiment, hardware system 400 includes processor 402 and cache memory 404 coupled to each other as shown. Additionally, hardware system 400 includes high performance input/output (I/O) bus 406 and standard I/O bus 408. Host bridge 410 couples processor 402 to high performance I/O bus 406, whereas I/O bus bridge 412 couples the two buses 406 and 408 to each other. Coupled to bus 406 are network/communication interface 424, system memory 414, and video memory 416. In turn, display device 418 is coupled to video memory 416. Coupled to bus 408 is mass storage 420 and keyboard and pointing device 422.

These elements 402–422 perform their conventional functions known in the art. In particular, network/communication interface 424 is used to provide communication between system 400 and any of a wide range of conventional networks, such as an Ethernet, token ring, the Internet, etc. It is to be appreciated that the circuitry of interface 424 is dependent on the type of network the system 400 is being coupled to.

Mass storage 420 is used to provide permanent storage for the data and programming instructions to implement the above described functions, whereas system memory 414 is used to provide temporary storage for the data and programming instructions when executed by processor 402. Mass storage 420 may be provided with the programming instructions by loading the programming instructions from a distribution storage medium (not shown), or by downloading the programming distributions from a server (not shown) coupled to hardware system 400 via network/communication interface 424. Collectively, these elements are intended to represent a broad category of hardware systems, including but not limited general purpose computer systems based on the Pentium® processor or Pentium® Pro processor, manufactured by Intel Corporation of Santa Clara, Calif.

It is to be appreciated that various components of hardware system 400 may be re-arranged. For example, cache 404 may be on-chip with processor 402. Furthermore, certain implementations of the present invention may not require nor include all of the above components. For example, mass storage 420, keyboard and pointing device 422, and/or display device 418 and video memory 416 may not be included in system 400. Additionally, the peripheral devices shown coupled to standard I/O bus 408 may be coupled to high performance I/O bus 406; in addition, in some implementations only a single bus may exist with the components of hardware system 400 being coupled to the single bus. Furthermore, additional components may be included in system 400, such as additional processors, storage devices, or memories.

In one embodiment, the method and apparatus for providing user-based flow control in a network system discussed above is implemented as a series of software routines run by the hardware system of FIG. 4. These software routines comprise a plurality or series of instructions to be executed by a processor in a hardware system, such as processor 402 of FIG. 4. Initially, the series of instructions are stored on a storage device, such as mass storage 420. The instructions are copied from storage device 420 into memory 414 and then accessed and executed by processor 402. In one implementation, these software routines are written in the C++ programming language. It is to be appreciated, however, that these routines may be implemented in any of a wide variety of programming languages. In alternate embodiments, the present invention is implemented in discrete hardware or firmware. For example, an application specific integrated circuit (ASIC) could be programmed with the above described functions of the present invention.

In several of the discussions above, the network environment is described as being the Internet. It is to be appreciated, however, that the present invention can be used with any type of network environment and is not limited to the Internet. By way of example, the present invention could also be used with a local area network (LAN) or an Intranet.

Also in the discussions above, the present invention is described as being implemented in a host system on the Internet. However, it is to be appreciated that the present invention can be implemented in any of a wide range of devices at which a bottleneck can occur. For example, the present invention can be used in a gateway system which sits between a local area network (LAN) and an external network such as the Internet. In this example, the present invention operates to control the flow of data received from the external network to the requesting client systems on the LAN.

Thus, the present invention provides a method and apparatus for providing user-based flow control in a network system. A host system receives a request for data and separates the requested data into multiple portions. The data is then advantageously sent from the host system to the requesting client system in portions with a time delay between each of the portions. Thus, if a user realizes that the requested data is not truly desired by the user, then the user can stop the data transfer before additional portions of data are transferred to the user, thereby advantageously reducing the amount of data transferred to the user's system. This results in advantageously reducing the amount of data that a host system sends as well as the amount of data being transferred on the network.

Whereas many alterations and modifications of the present invention will be comprehended by a person skilled in the art after having read the foregoing description, it is to be understood that the particular embodiments shown and described by way of illustration are in no way intended to be considered limiting. References to details of particular embodiments are not intended to limit the scope of the claims.

What is claimed is:

1. A machine implemented method for controlling the flow of data to a client system on a network, the method comprising:

receiving a request for data from a client system;

automatically identifying a first portion of the data by scanning the data for a first formatting identifier, wherein portions of data are variable in size;

dynamically determining a first period of time based on an expected user processing time for the first portion of the data;

sending the first portion of the data to the client system;

automatically identifying a second portion of the data by scanning the data for a second formatting identifier; and sending the second portion of the data to the client system after the first period of time has elapsed.

2. The method of claim 1, further comprising:

dynamically determining a second period of time based on an expected user processing time for the second portion of the data; and repeating the automatically identifying the second portion of data, the dynamically determining a second period of time, and the sending the second portion of the data to the client system until all the data has been sent to the client system.

3. The method of claim 1, wherein the first and second formatting identifiers are HyperText Markup Language (HTML) commands.

4. The method of claim 1, wherein the automatically identifying is further based on one or more previous requests for the data.

5. The method of claim 1, wherein the dynamically determining is further based on one or more previous requests for the data.

6. The method of claim 1, wherein the network is the Internet.

7. A computer-readable medium having stored thereon a plurality of instructions, designed to be executed by a processor, wherein execution of the instructions implements a function to:

receive a request for data from a client system;

automatically identify a first portion of the data by scanning the data for a first formatting identifier, wherein portions of data are variable in size;

dynamically determine a first period of time based on an expected user processing time for the first portion of the data;

send the first portion of the data to the client system;

automatically identify a second portion of the data by scanning the data for a second formatting identifier; and send the second portion of the data to the client system after the first period of time has elapsed.

8. The computer-readable medium of claim 7, wherein execution of the plurality of instructions further implements a function to:

continually send a next portion of the data to the client system at dynamically determined periodic intervals equal to a previous period of time based on an expected user processing time for a previous portion of the data until all the data has been sent to the client system.

9. The computer-readable medium of claim 7, wherein the first and second formatting identifiers are HyperText Markup Language (HTML) commands.

10. The computer-readable medium of claim 7, wherein the first portion and the second portion are identified adaptively based on one or more previous requests for the data.

11. The computer-readable medium of claim 7, wherein the periods of time are further dynamically determined based on one or more previous requests for the data.

12. An apparatus for controlling the flow of data to a client system on a network, the apparatus comprising:

a data servicing logic to receive a request for data from a client system; and a flow control logic, coupled to the data servicing logic, to receive the data from the data servicing logic, to automatically identify a first portion of the data by scanning the data for a first formatting identifier, wherein portions of data are variable in size to dynamically determine a first period of time based on an expected user processing time for the first portion of the data, to send the first portion of the data to the client system, to automatically identify a second portion of the data by scanning the data for a second formatting identifier, and send the second portion of the data to the client system after the first period of time has elapsed.

13. The apparatus of claim 12, wherein the first and second formatting identifiers are HyperText Markup Language (HTML) commands.

14. The apparatus of claim 12, wherein the flow control logic further identifies the first portion and the second portion based on one or more previous requests for the data.

15. The apparatus of claim 12, wherein the flow control logic further dynamically determines the periods of time based on one or more previous requests for the data.

16. The apparatus of claim 12, wherein the network is the Internet.

17. An apparatus for controlling the flow of data to a client system on a network, the apparatus comprising:

means for receiving a request for data from a client system;

means for automatically identifying a first portion o the data by scanning the data a first formatting identifier, wherein portions of data are variable in size;

means for dynamically determining a first period of time based on an expected user processing time for the first portion of the data;

means for sending the first portion of the data to the client system;

means for automatically identifying a next portion of the data by scanning the data for a second formatting identifier; and means for sending the second portion of the data to the client system after the first period of time has elapsed.

18. The apparatus of claim 17, wherein the first and second formatting identifiers are HyperText Markup Language (HTML) commands.

19. The apparatus of claim 17, wherein the means for automatically identifying the first portion and the second portion is further based on one or more previous requests for the data.

20. The apparatus of claim 17, wherein the means for dynamically determining the period of time is further based on one or more previous requests for the data.

* * * * *